United States Patent
Kim

(10) Patent No.: US 10,249,882 B2
(45) Date of Patent: *Apr. 2, 2019

(54) POSITIVE ELECTRODE FOR LITHIUM AIR BATTERY, METHOD OF PREPARING SAME AND LITHIUM AIR BATTERY INCLUDING SAME

(71) Applicant: SAMSUNG SDI CO., LTD., Yongin-si, Gyeonggi-do (KR)

(72) Inventor: In Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 807 days.

This patent is subject to a terminal disclaimer.

(21) Appl. No.: 14/640,417

(22) Filed: Mar. 6, 2015

(65) Prior Publication Data

US 2015/0288001 A1 Oct. 8, 2015

(30) Foreign Application Priority Data

Apr. 8, 2014 (KR) ......................... 10-2014-0041971

(51) Int. Cl.
| | |
|---|---|
| *H01M 4/62* | (2006.01) |
| *H01M 4/88* | (2006.01) |
| *H01M 4/86* | (2006.01) |
| *H01M 4/38* | (2006.01) |
| *H01M 4/92* | (2006.01) |
| *H01M 12/08* | (2006.01) |
| *H01M 4/90* | (2006.01) |

(52) U.S. Cl.
CPC ......... *H01M 4/8825* (2013.01); *H01M 4/382* (2013.01); *H01M 4/8668* (2013.01); *H01M 4/8673* (2013.01); *H01M 4/926* (2013.01); *H01M 12/08* (2013.01); *H01M 4/624* (2013.01); *H01M 4/8657* (2013.01); *H01M 4/9075* (2013.01); *H01M 4/925* (2013.01); *H01M 2004/8689* (2013.01); *Y02E 60/128* (2013.01)

(58) Field of Classification Search
CPC ... H01M 4/925; H01M 4/9075; H01M 4/8657
See application file for complete search history.

(56) References Cited

U.S. PATENT DOCUMENTS

| | | | |
|---|---|---|---|
| 7,767,345 B2 | 8/2010 | Imagawa et al. | |
| 9,318,783 B2 * | 4/2016 | Kim | H01M 4/8803 |
| 2008/0176124 A1* | 7/2008 | Imagawa | H01M 4/382 429/405 |
| 2009/0130515 A1* | 5/2009 | Son | H01M 4/861 429/481 |
| 2010/0009234 A1* | 1/2010 | Stefener | B01J 35/0033 429/454 |

(Continued)

FOREIGN PATENT DOCUMENTS

| | | |
|---|---|---|
| JP | 2008-198590 | 8/2008 |
| KR | 10-2008-0083112 A | 9/2008 |
| KR | 10-2011-0119575 A | 11/2011 |

*Primary Examiner* — Jeremiah R Smith
(74) *Attorney, Agent, or Firm* — Lee & Morse, P.C.

(57) ABSTRACT

A positive electrode for a lithium air battery includes a current collector and a catalyst layer positioned on the current collector. The catalyst layer includes a binder, a conductive particle surrounding the binder, and a catalyst particle spaced apart from the binder, the catalyst particle being on the surface of the conductive particle.

7 Claims, 4 Drawing Sheets

(56) References Cited

U.S. PATENT DOCUMENTS

2011/0123897 A1* 5/2011 Kawaji ............... H01M 4/8652
                                                              429/482
2011/0177400 A1* 7/2011 Chua ................... H01M 2/0277
                                                              429/405
2013/0280625 A1* 10/2013 Shimamune .......... C25B 11/035
                                                              429/405

* cited by examiner

POSITIVE ELECTRODE FOR LITHIUM AIR BATTERY, METHOD OF PREPARING SAME AND LITHIUM AIR BATTERY INCLUDING SAME

CROSS-REFERENCE TO RELATED APPLICATION

Korean Patent Application No. 10-2014-0041971, filed on Apr. 8, 2014, in the Korean Intellectual Property Office, and entitled: "Positive Electrode for Lithium Air Battery, Method of Preparing Same and Lithium Air Battery Including Same," is incorporated by reference herein in its entirety.

BACKGROUND

1. Field

Embodiments are directed to a positive electrode for a lithium air battery, a method of manufacturing the same, and a lithium air battery.

2. Description of the Related Art

Recent developments in high tech electronic industries have spurred lightening and down-sizing of electronic equipment. Accordingly, portable electronic devices have been increasingly used. Lithium air batteries have been developed as a power source for the portable electronic devices.

SUMMARY

Embodiments are directed to a positive electrode for a lithium air battery including a current collector and a catalyst layer on the current collector. The catalyst layer includes a binder, a conductive particle surrounding the binder, and a catalyst particle spaced apart from the binder, the catalyst particle being on a surface of the conductive particle.

The catalyst particle may be on at least one surface of the conductive particle.

The catalyst particle may include Pt, Au, Ru, Pd, Co, Cr, or a combination thereof.

The catalyst particle may be present in the catalyst layer in an amount of about 5 wt % to about 80 wt % based on a total amount of the catalyst layer.

The conductive particle may include graphite, denka black, ketjen black, acetylene black, carbon nanotube, a carbon nano fiber, a carbon nano wire, a carbon nano ball, activated carbon, graphene, or a combination thereof.

The conductive particle may be present in the catalyst layer in an amount of about 20 wt % to about 75 wt % based on a total amount of the catalyst layer.

The binder may include polytetrafluoroethylene, polyvinylidene fluoride, polyvinyl alcohol, carboxymethyl cellulose, hydroxypropyl cellulose, diacetyl cellulose, polyvinylchloride, carboxylated polyvinylchloride, an ethylene oxide-containing polymer, polyvinylpyrrolidone, polyurethane, polyethylene, polypropylene, a styrene-butadiene rubber, an acrylated styrene-butadiene rubber, an epoxy resin, nylon, poly(perfluorosulfonic acid), poly(tetrafluoroethylene), fluorinated ethylene-propylene, sodium carboxymethyl cellulose, or a combination thereof.

Embodiments are also directed to a method of manufacturing a positive electrode for a lithium air battery, including mixing a binder and a conductive particle to prepare a first composite, mixing the first composite and a metal-containing precursor to prepare a second composite, heat-treating the second composite, and attaching the heat-treated second composite onto a current collector.

The binder may include polytetrafluoroethylene, polyvinylidene fluoride, polyvinyl alcohol, carboxymethyl cellulose, hydroxypropyl cellulose, diacetyl cellulose, polyvinylchloride, carboxylated polyvinylchloride, an ethylene oxide-containing polymer, polyvinylpyrrolidone, polyurethane, polyethylene, polypropylene, a styrene-butadiene rubber, an acrylated styrene-butadiene rubber, an epoxy resin, nylon, poly(perfluorosulfonic acid), poly(tetrafluoroethylene), fluorinated ethylene-propylene, sodium carboxymethyl cellulose, or a combination thereof.

The conductive particle may include graphite, denka black, ketjen black, acetylene black, carbon nanotube, a carbon nano fiber, a carbon nano wire, a carbon nano ball, activated carbon, graphene, or a combination thereof.

The first composite may be prepared by mixing about 10 wt % to about 50 wt % of the binder and about 50 wt % to about 90 wt % of the conductive particle.

The metal-containing precursor may include a metal of Pt, Au, Ru, Pd, Co, Cr, or a combination thereof.

The second composite may be prepared by mixing about 20 wt % to about 95 wt % of the first composite and about 5 wt % to about 80 wt % of the metal-containing precursor.

The heat treatment may be performed at about 25° C. to about 120° C.

A lithium air battery may include the positive electrode, a negative electrode; and an electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
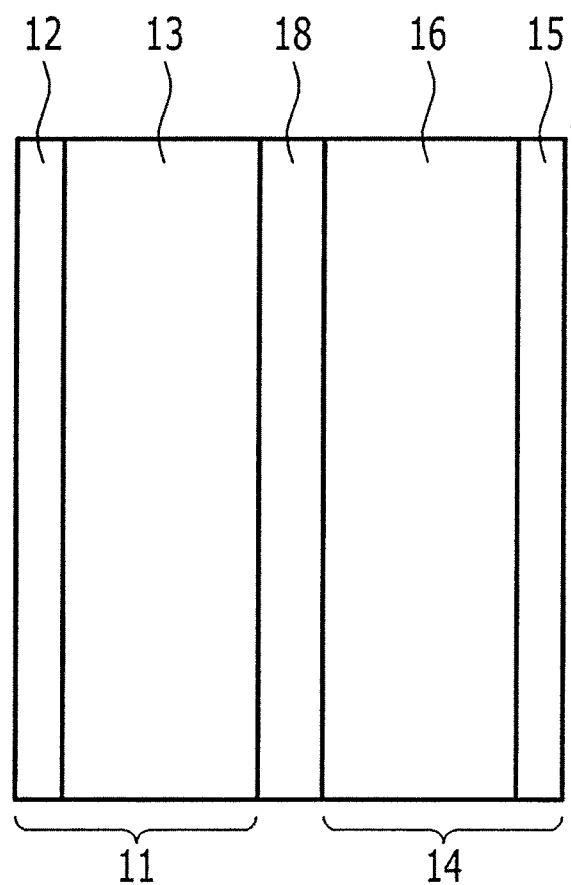
FIG. 1 illustrates a schematic view showing a structure of a lithium air battery according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "between" two layers, it can be the only layer between the two layers, or one or more intervening layers may also be present. Like reference numerals refer to like elements throughout.

A lithium air battery according to one embodiment is illustrated referring to FIG. 1.

FIG. 1 illustrates a schematic view showing the structure of the lithium air battery according to one embodiment.

Referring to FIG. 1, the lithium air battery 10 may include a positive electrode 11 that uses oxygen as a positive active material, a negative electrode 14 capable of intercalating and deintercalating lithium ions, an electrolyte (not shown) impregnated between the positive electrode 11 and the negative electrode 14, and a separator 18 positioned between the positive electrode 11 and the negative electrode 14.

The positive electrode 11 may include a first current collector 12 and a catalyst layer 13 on the first current collector 12.

The negative electrode 14 may include a second current collector 15 and a negative active material layer 16 on the second current collector 15.

The positive electrode 11 is specifically illustrated.

The first current collector 12 included in the positive electrode 11 may include a suitable material having conductivity. For example, copper, nickel, stainless steel, titanium, aluminum, iron, carbon, or a combination thereof may be used. The first current collector 12 may have, for example, a foil-shape, a sheet-shape, a mesh shape, a grid shape, a foam shape, or the like.

The catalyst layer 13 may include a binder, a conductive particle, and a catalyst particle.

The catalyst layer 13 according to an embodiment may have a structure such that reaction area of the catalyst particle is largely increased. An example of this structure of the catalyst layer 13 is illustrated in FIG. 2.

Figure 2:
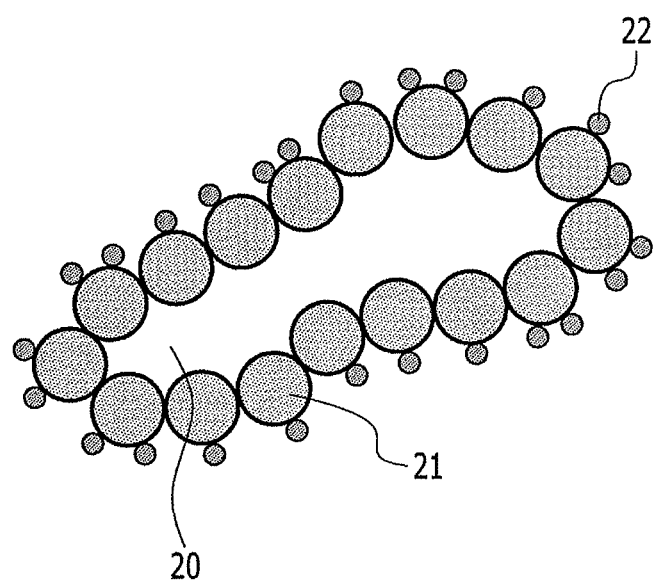
FIG. 2 illustrates a schematic view showing a structure of a catalyst layer at a positive electrode for a lithium air battery according to one embodiment.

FIG. 2 illustrates a schematic view showing a structure of a catalyst layer in a positive electrode for a lithium air battery according to an embodiment.

Referring to FIG. 2, the catalyst layer may include a binder 20, a conductive particle 21 surrounding the binder 20, and a catalyst particle 22 separated from the binder 20 and positioned on the surface of the conductive particle 21.

The catalyst layer may have a structure such that the conductive particle 21 surrounds the binder 20 as one layer. In addition, at least one catalyst particle per one conductive particle 21 may be positioned on the surface of the conductive particle 21.

A catalyst layer according to a comparative embodiment may be manufactured by using a composite in which a catalyst particle is supported on a conductive particle such that the catalyst particle is positioned on the entire surface of the conductive particle. The structure of the comparative catalyst layer is provided in FIG. 3 for better understanding.

Figure 3:
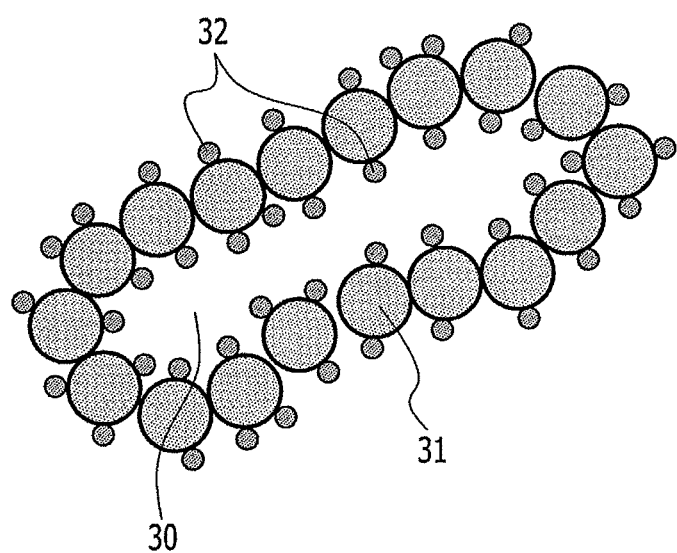
FIG. 3 illustrates a schematic view showing a structure of a catalyst layer at a conventional positive electrode for a lithium air battery.

FIG. 3 illustrates a schematic view showing a structure of the comparative catalyst layer in a positive electrode for a lithium air battery.

Referring to FIG. 3, the catalyst layer may include a binder 30, a conductive particle 31 surrounding the binder 30 and a catalyst particle 32 on the surface of the conductive particle 31. The catalyst particle 32 may exist where the conductive particle 31 does not contact the binder 30 but is separated therefrom and where the conductive particle 31 is not separated from the binder 30 but is in contact therewith. In other words, the catalyst particle 32 may exist on the surface of the conductive particle 31 contacting the binder 30 and the surface of the conductive particle 31 not contacting the binder 30 but separated therefrom.

Because of this structure, at least a part of the catalyst particles 32 does not contact a fuel and a lithium ion and thus, does not participate in an electrochemical reaction and has inactivity.

According to the embodiment illustrated in FIG. 2, on the other hand, the catalyst layer has a structure such that the catalyst particle 22 is positioned on the surface of the conductive particle 21, and is spaced apart from the binder 20, for example, does not contact the binder 20. The catalyst particle 22 may not exist on the surface of the conductive particle 21 that contacts the binder 20, but instead, is on the surface of the conductive particle 21 that does not contact the binder 20 such that the catalyst particle 22 is spaced apart from the binder 20. In this structure, almost all the catalyst particles may contact a fuel and a lithium ion and may participate in an electrochemical reaction. Thus, a reaction area of the catalyst particles may be largely increased. Accordingly, catalyst efficiency of the lithium air battery may be increased, and output characteristics thereof may be improved.

The catalyst particle may be used to further smooth an electrode reaction and may play a role of increasing an oxidation reduction capability of oxygen as a positive electrode fuel.

Examples of the catalyst particle may include Pt, Au, Ru, Pd, Co, Cr, or a combination thereof.

According to an implementation, the reaction area of the catalyst may be increased. For example, when Pt is used as the catalyst, the platinum catalyst may have mass activity ranging from about 600 $mA \cdot cm^2 \cdot Pt \cdot mg^{-1}$ to about 1200 $mA \cdot cm^2 \cdot Pt \cdot mg^{-1}$, specifically, about 900 $mA \cdot cm^2 \cdot Pt \cdot mg^{-1}$ to about 1200 $mA \cdot cm^2 \cdot Pt \cdot mg^{-1}$, and more specifically about 1000 $mA \cdot cm^2 \cdot Pt \cdot mg^{-1}$ to about 1200 $mA \cdot cm^2 \cdot Pt \cdot mg^{-1}$. When the mass activity is within the range, catalyst efficiency of a lithium air battery may be increased, and thus, excellent power characteristics thereof may be realized.

The catalyst particle may be included in an amount of about 5 wt % to about 80 wt %, for example, about 5 wt % to about 60 wt %, or, for example, about 10 wt % to about 40 wt % based on the total amount of the catalyst layer. When the catalyst particle is included within the range, catalyst efficiency may increase.

The conductive particle may function as a support of the catalyst particle, and may be, for example, graphite, denka black, ketjen black, acetylene black, carbon nanotube, a carbon nano fiber, a carbon nano wire, a carbon nano ball, activated carbon, graphene, or a combination thereof.

The conductive particle may be included in an amount of about 20 wt % to about 75 wt %, for example, about 20 wt % to about 70 wt %, or, for example, about 30 wt % to about 60 wt %, based on the total amount of the catalyst layer. When the conductive particle is included within the range, catalyst efficiency may increase.

The binder may function as a backbone for maintaining a structure of the catalyst layer. The binder may include, for example, polytetrafluoroethylene, polyvinylidene fluoride, polyvinyl alcohol, carboxymethyl cellulose, hydroxypropyl cellulose, diacetyl cellulose, polyvinylchloride, carboxylated polyvinylchloride, an ethylene oxide-containing polymer, polyvinylpyrrolidone, polyurethane, polyethylene, polypropylene, a styrene-butadiene rubber, an acrylated styrene-butadiene rubber, an epoxy resin, nylon, poly(perfluorosulfonic acid), poly(tetrafluoroethylene), fluorinated ethylene-propylene, sodium carboxymethyl cellulose, or a combination thereof.

A method of manufacturing a positive electrode for a lithium air battery including the catalyst layer is as follows.

The binder and the conductive particle may be mixed to prepare a first composite. The first composite may be mixed with a metal-containing precursor to prepare a second composite. Then, the second composite may be heat-treated.

Subsequently, the heat-treated second composite may be attached to the first current collector, manufacturing the positive electrode.

According to an embodiment, the catalyst layer may be formed by first mixing the binder with the conductive particle to prepare the first composite and then, mixing the mixture with a precursor including a catalyst particle rather than first preparing the composite by supporting the catalyst particle in the conductive particle and then mixing the composite with the binder. In the method according to the embodiment, the catalyst layer may have a structure such that the catalyst particle does not contact the binder but is separated therefrom and exists on the surface of the conductive particle. Accordingly, the reaction area of the catalyst particle may be largely increased, and thus, excellent catalyst efficiency may be obtained.

The first composite may be prepared by mixing about 10 wt % to about 50 wt % of the binder and about 50 wt % to about 90 wt % of the conductive particle, or, for example, about 20 wt % to about 30 wt % of the binder and about 70 wt % to about 80 wt % of the conductive particle, at about 50° C. to about 75° C., and then filtering, drying, and grinding the mixture.

The above catalyst particle may be obtained from the metal-containing precursor used to prepare the second composite. The metal may be the same as the above catalyst particle.

The metal-containing precursor may include, for example, metallic chloride acid such as chloroplatinic acid, metal chloride, metal nitrate, ammonium metallic chloride acid such as ammonium hexachloroplatinate, or the like.

The second composite may be prepared by mixing about 20 wt % to about 95 wt % of the first composite and about 5 wt % to about 80 wt % of the metal-containing precursor, or, for example, about 40 wt % to about 95 wt % of the first composite and about 5 wt % to about 60 wt % of the metal-containing precursor. The mixture may be filtered to obtain a solid. The solid may be washed and dried at a temperature greater than or equal to about 100° C. for an amount of time greater than or equal to about 1 hour.

The heat treatment of the second composite may be performed at about 25° C. to about 120° C., or for example, about 100° C. to about 120° C., or, for example, about 100° C. to about 110° C. When the heat treatment is performed within the range, impurities in the catalyst particle may be decreased.

After the heat treatment, the second composite may be compressed through rolling.

The second composite may be attached to the first current collector. The attachment may be performed by a coating process at about 50° C. to 80° C.

Figure 4:
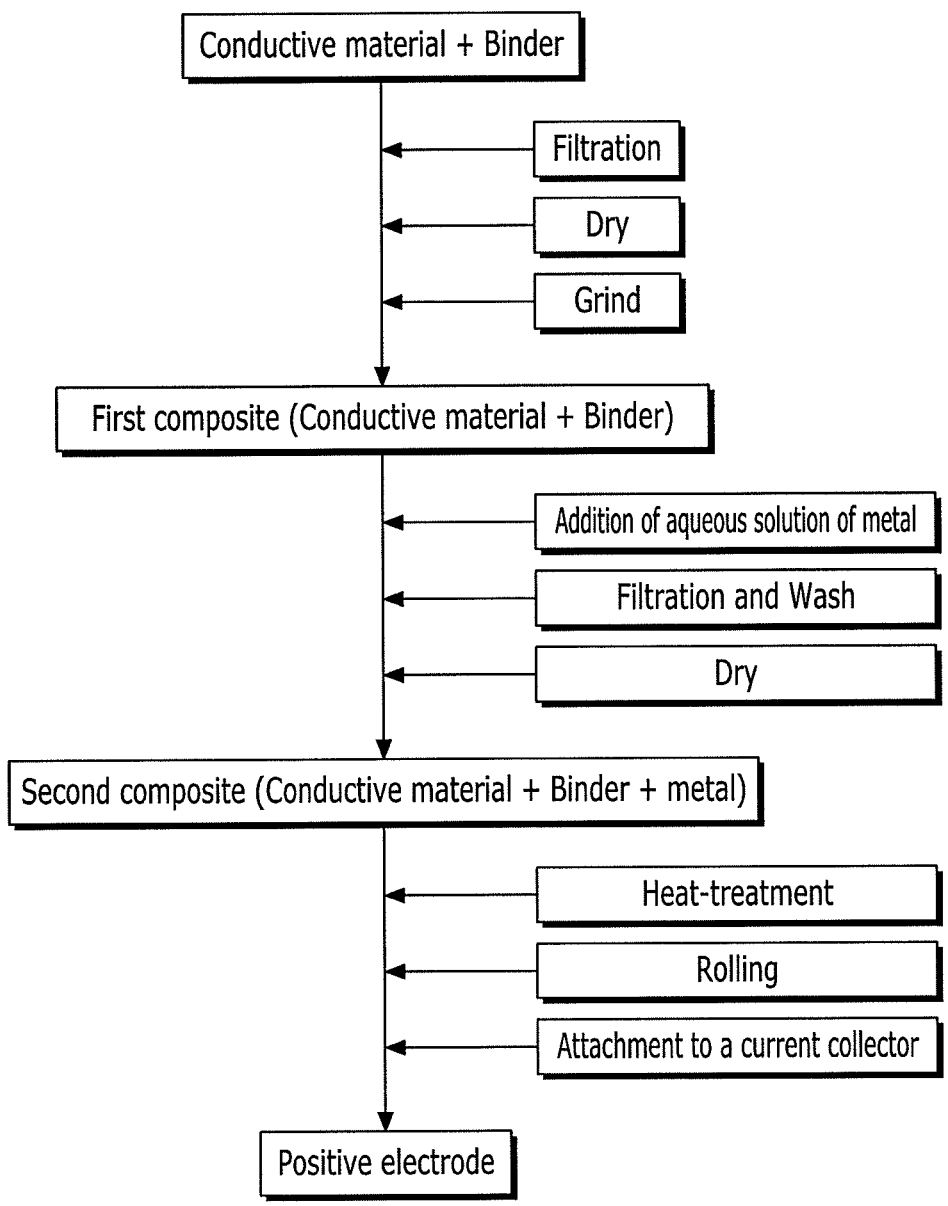
FIG. 4 illustrates a flowchart showing a method of manufacturing the positive electrode for a lithium air battery according to one embodiment.

The above method of manufacturing a positive electrode for a lithium air battery is summarized in FIG. 4.

FIG. 4 illustrates a flowchart showing a method of manufacturing a positive electrode for a lithium air battery according to an embodiment. FIG. 4 shows an example of the method of manufacturing a positive electrode for a lithium air battery.

The second current collector 15 included in the negative electrode 14 of the lithium air battery (see FIG. 1) may be the same as the first current collector 12 described above.

The negative active material layer 16 may include a negative active material and further, may include a binder, a conductive material, or a combination thereof.

The negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions may be a carbon material, for example, any suitable carbon-based negative active material for a lithium ion rechargeable battery. Examples thereof may include crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material that is capable of doping/dedoping lithium include Si, $SiO_x$ ($0<x<2$), a Si—C composite, a Si—Y alloy (wherein Y is an element selected from an alkali metal, an alkaline-earth metal, Group 13 to 16 elements, transition metal, a rare earth element, and a combination thereof, and is not Si), Sn, $SnO_2$, a Sn—C composite, Sn—Y (wherein Y is an element selected from an alkali metal, an alkaline-earth metal, Group 13 to 16 elements, transition metal, a rare earth element, and a combination thereof, and is not Sn), or the like. At least one of these materials may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

The binder may improve binding properties of negative active material particles with one another and with the second current collector. Examples thereof may include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may improve the conductivity of the negative electrode 14. Any suitable electrically conductive material that does not cause a chemical change may be used as a conductive material. Examples thereof include a carbon-based material such as natural graphite, artificial graphite, carbon black, acetylene black, ketjen black, a carbon fiber, or the like; a metal-based material such as copper, nickel, aluminum, silver, and the like metal powder or metal fiber or the like; a conductive polymer such as a polyphenylene derivative or the like; or a mixture thereof.

The negative electrode may be manufactured by a method including mixing the negative active material, the conductive material and the binder in a solvent to prepare a negative active material layer composition, and coating the negative active material layer composition on the current collector. The solvent may include, for example, N-methylpyrrolidone or the like.

The electrolyte may include a non-aqueous organic solvent and a lithium salt.

The non-aqueous organic solvent may serve as a medium for transmitting ions taking part in the electrochemical reaction of a battery. The non-aqueous organic solvent may be selected from a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

When a linear carbonate compound and a cyclic carbonate compound are mixed, a solvent having a high dielectric constant and a low viscosity may be provided. The cyclic carbonate compound and linear carbonate compound may be mixed together in a volume ratio ranging from about 1:1 to about 1:9.

The ester-based solvent may include, for example, methylacetate, ethylacetate, n-propylacetate, dimethylacetate, methylpropionate, ethylpropionate, γ-butyrolactone, decanolide, valerolactone, mevalonolactone, caprolactone, or the like. The ether-based solvent may include, for example dibutylether, tetraglyme, diglyme, dimethoxyethane, 2-methyltetrahydrofuran, tetrahydrofuran, or the like. The ketone-based solvent may include cyclohexanone, or the like. The alcohol-based solvent may include ethyl alcohol, isopropyl alcohol, or the like.

The non-aqueous organic solvent may be used singularly or in a mixture. When the organic solvent is used in a mixture, the mixture ratio may be controlled in accordance with a desirable battery performance.

The non-aqueous electrolyte may further include an overcharge inhibitor additive such as ethylenecarbonate, pyrocarbonate, or the like.

The lithium salt may be dissolved in an organic solvent. The lithium salt may supply lithium ions in a battery, basically operate the rechargeable lithium battery, and improve lithium ion transportation between positive and negative electrodes therein.

Specific examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, LiN $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato)borate, LiBOB), or a combination thereof.

The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The separator 18 may have a suitable composition to satisfy the use range for a lithium air battery. For example, the separator 18 may include a polymer non-woven fabric such as a non-woven fabric made of a polypropylene material, a non-woven fabric made of a polyphenylene sulfide material or the like, an olefin-based resin porous film such as polyethylene, polypropylene, or the like, or a combination of more than two thereof.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Lithium Air Battery Cell

Example 1

A first composite was prepared by mixing 33.3 wt % of polytetrafluoroethylene (PTFE) and 66.7 wt % of carbon black at 50° C. to 60° C. and then, filtering, drying and grinding the mixture. 90 wt % of the first composite and 10 wt % of an $H_2PtCl_6 \cdot nH_2O$ solution (solvent: isopropylalcohol) were mixed, filtered, washed and dried at 100° C. for 3 hours, preparing a second composite. The second composite was heat-treated at 100° C. and mixed with isopropyl alcohol, and the resulting mixture was rolled. The heat-treated second composite was attached to carbon paper, thereby manufacturing a positive electrode on which a catalyst layer was formed. The attachment was performed by the coating process at 60° C.

For a negative electrode, a lithium metal thin film was used. For a separator disposed between the positive and negative electrodes, a polyethylene polymer film was used. An electrolyte was obtained by dissolving 1.15 M $LiPF_6$ in a mixture of ethylene carbonate, dimethyl carbonate and methylethyl carbonate (a volume ratio of 3:4:3), thereby manufacturing a lithium air battery cell.

Comparative Example 1

A catalyst solution was prepared by adding platinum supported on carbon (Cabot Co., Vulcan) to an isopropyl alcohol solvent. Polytetrafluoroethylene was added to the catalyst solution, preparing a catalyst composition. The carbon and the polytetrafluoroethylene were respectively used in an amount of 70 wt % and 30 wt % based on the total amount of a solid in the catalyst composition. The platinum was used in an amount of 10 parts by weight based on 100 parts by weight of the total weight of the carbon and the polytetrafluoroethylene. The catalyst composition was coated and dried on an Al current collector, manufacturing a positive electrode on which a catalyst layer was formed. The amount of the platinum was 10 wt % based on the total amount of the catalyst layer.

For a negative electrode, a lithium metal thin film was used. For a separator disposed between the positive and negative electrodes, a polyethylene polymer film was used. An electrolyte was obtained by dissolving 1.15 M of $LiPF_6$ in a mixture of ethylene carbonate, dimethyl carbonate and methylethyl carbonate (a volume ratio of 3:4:3), thereby manufacturing a lithium air battery cell.

Evaluation 1: Evaluation of Catalyst Layer

Power ($W/cm^2$) capable of being generated per unit area of the battery cells manufactured by respectively using the catalyst layers of Example 1 and Comparative Example 1 was converted into a loading amount ($mg/cm^2$) of the platinum to measure a mass activity of a catalyst.

As a result of the measurement, the mass activity of the platinum of Example 1 was 0.27 $W \cdot mg_{Pt}^{-1}$, and the mass activity of the platinum of Comparative Example 1 was 0.16 $W \cdot mg_{Pt}^{-1}$.

Referring to the result, the catalyst of Example 1, prepared by first mixing a binder and a conductive particle and adding a metal-containing precursor thereto to provide a structure wherein the catalyst particle was positioned on the surface of the conductive particle not contacting but spaced apart from the binder, exhibited a larger reaction area. On the other hand, the catalyst of Comparative Example 1, prepared by first mixing a conductive particle and a catalyst and adding a binder thereto to provide a structure wherein the catalyst particle existed on the surface of the conductive particle where the conductive particle contacted with the binder, exhibited had a smaller reaction area.

Evaluation 2: Evaluation of Power Characteristics of Lithium Air Battery Cell

The lithium air battery cells according to Example 1 and Comparative Example 1 were charged and discharged 20 times under a condition of 4.1 V and 500 mA of a current, and power characteristics of the lithium air battery cells were measured. The lithium air battery cell of Example 1 showed about 50% to 80% improved output compared with the lithium air battery cell of Comparative Example 1.

By way of summation and review, lithium air batteries realize remarkably higher energy density than lithium ion batteries by contacting lithium with the air and have an advantage of being easily down-sized, being lighter, and the like. When applied to an electric vehicle, a lithium air battery may improve its mileage up to greater than or equal to about 500 km compared with a lithium ion battery, which may provide a mileage of only 160 km. Accordingly, research on lithium air batteries as a useful power source for an electric vehicle is actively conducted.

Lithium air batteries include a positive electrode using oxygen as a positive active material, a negative electrode capable of intercalating and deintercalating lithium ions, and an electrolyte. When lithium air batteries are operated, lithium is deintercalated during charge and intercalated during discharge at the negative electrode, while oxygen is oxidize during the charge and released during the discharge at the positive electrode.

Lithium air batteries have a very higher energy density but may have lower power than lithium ion batteries.

Embodiments provide a positive electrode for a lithium air battery that may have excellent output characteristics. Embodiments provide a method of manufacturing the positive electrode for a lithium air battery. Embodiments provide a lithium air battery including the positive electrode.

According to embodiments, as reaction area of the catalyst becomes larger, a lithium air battery having excellent output characteristics may be realized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive electrode for a lithium air battery, the positive electrode comprising:
   a current collector and a catalyst layer on the current collector,
   wherein the catalyst layer comprises:
   a binder,
   conductive particles surrounding the binder, and
   catalyst particles spaced apart from the binder, the catalyst particles being on surfaces of the conductive particles such that none of the catalyst particles on the surfaces of the conductive particles contact the binder.

2. The positive electrode for a lithium air battery as claimed in claim 1, wherein the catalyst particles include Pt, Au, Ru, Pd, Co, Cr, or a combination thereof.

3. The positive electrode for a lithium air battery as claimed in claim 1, wherein the catalyst particles are present in the catalyst layer in an amount of about 5 wt % to about 80 wt % based on a total amount of the catalyst layer.

4. The positive electrode for a lithium air battery as claimed in claim 1, wherein the conductive particles include graphite, denka black, ketjen black, acetylene black, carbon nanotube, a carbon nano fiber, a carbon nano wire, a carbon nano ball, activated carbon, graphene, or a combination thereof.

5. The positive electrode for a lithium air battery as claimed in claim 1, wherein the conductive particles are present in the catalyst layer in an amount of about 20 wt % to about 75 wt % based on a total weight of the catalyst layer.

6. The positive electrode for a lithium air battery as claimed in claim 1, wherein the binder includes polytetrafluoroethylene, polyvinylidene fluoride, polyvinyl alcohol, carboxymethyl cellulose, hydroxypropyl cellulose, diacetyl cellulose, polyvinylchloride, carboxylated polyvinylchloride, an ethylene oxide-containing polymer, polyvinylpyrrolidone, polyurethane, polyethylene, polypropylene, a styrene-butadiene rubber, an acrylated styrene-butadiene rubber, an epoxy resin, nylon, poly(perfluorosulfonic acid), poly(tetrafluoroethylene), fluorinated ethylene-propylene, sodium carboxymethyl cellulose, or a combination thereof.

7. A lithium air battery, comprising
   the positive electrode as claimed in claim 1;
   a negative electrode; and
   an electrolyte.

* * * * *